(12) United States Patent
Chou

(10) Patent No.: US 8,627,857 B2
(45) Date of Patent: Jan. 14, 2014

(54) DEVICE FOR SEALING AND INFLATING INFLATABLE OBJECT

(76) Inventor: Wen San Chou, Tainan (TW)

( * ) Notice: Subject to any disclaimer, the term of this patent is extended or adjusted under 35 U.S.C. 154(b) by 304 days.

(21) Appl. No.: 13/134,555

(22) Filed: Jun. 10, 2011

(65) Prior Publication Data

US 2012/0231100 A1    Sep. 13, 2012

(30) Foreign Application Priority Data

Mar. 10, 2011    (TW) .................................. 100108047

(51) Int. Cl.
*B29C 73/02*    (2006.01)
*B65B 31/00*    (2006.01)

(52) U.S. Cl.
USPC .............. 141/38; 141/382; 141/383; 152/415

(58) Field of Classification Search
USPC ..................... 141/38, 382–383, 67, 329–330; 81/15.6; 152/415
See application file for complete search history.

(56) References Cited

U.S. PATENT DOCUMENTS

| | | |
|---|---|---|
| 6,176,285 B1 | 1/2001 | Gerresheim et al. |
| 6,283,172 B1 | 9/2001 | Thurner |
| 6,345,650 B1 | 2/2002 | Paasch et al. |
| 6,454,892 B1 | 9/2002 | Gerresheim et al. |
| 6,668,875 B2 * | 12/2003 | Kojima et al. .................. 141/38 |
| 6,786,247 B1 * | 9/2004 | Kemppainen et al. .......... 141/84 |
| 6,889,723 B2 | 5/2005 | Gerresheim et al. |
| 7,021,348 B2 | 4/2006 | Eriksen et al. |
| 7,178,564 B2 * | 2/2007 | Kojima et al. ................... 141/38 |
| 7,694,698 B2 * | 4/2010 | Marini ............................. 141/38 |
| 7,789,112 B1 * | 9/2010 | Wise ................................ 141/95 |
| 8,016,002 B2 * | 9/2011 | Yoshida et al. ................. 141/38 |
| 8,020,588 B2 * | 9/2011 | Wang .............................. 141/38 |
| 8,201,586 B2 * | 6/2012 | Yoshida et al. ................. 141/38 |
| 8,205,645 B2 * | 6/2012 | Dowel ............................ 141/38 |
| 8,276,624 B2 * | 10/2012 | Steele et al. .................... 141/38 |
| 2008/0145245 A1 * | 6/2008 | Chou ............................ 417/415 |
| 2013/0000777 A1 * | 1/2013 | Kojima et al. .................. 141/38 |
| 2013/0092286 A1 * | 4/2013 | Chou .............................. 141/38 |
| 2013/0105055 A1 * | 5/2013 | Chou ............................ 152/416 |

FOREIGN PATENT DOCUMENTS

EP         2186628 A1 *   5/2010

* cited by examiner

*Primary Examiner* — Timothy L Maust
*Assistant Examiner* — Timothy P Kelly
(74) *Attorney, Agent, or Firm* — Charles E. Baxley

(57) ABSTRACT

A sealing and inflating assembly includes an air compressor device engaged in a receptacle for generating a pressurized air, and a tire repairing container for receiving a sealing preparation, an outlet piece attached to a mouth opening of the tire repairing container and having an inlet conduit and an outlet conduit, a pipe is disposed in the container and includes one end coupled to the outlet piece and includes a bore for directing the pressurized air to flow through the bore of the pipe and to flow into a base portion of the container without flowing through the sealing preparation, for allowing the tire sealing preparation to be effectively supplied to seal and inflate the inflatable objects.

17 Claims, 14 Drawing Sheets

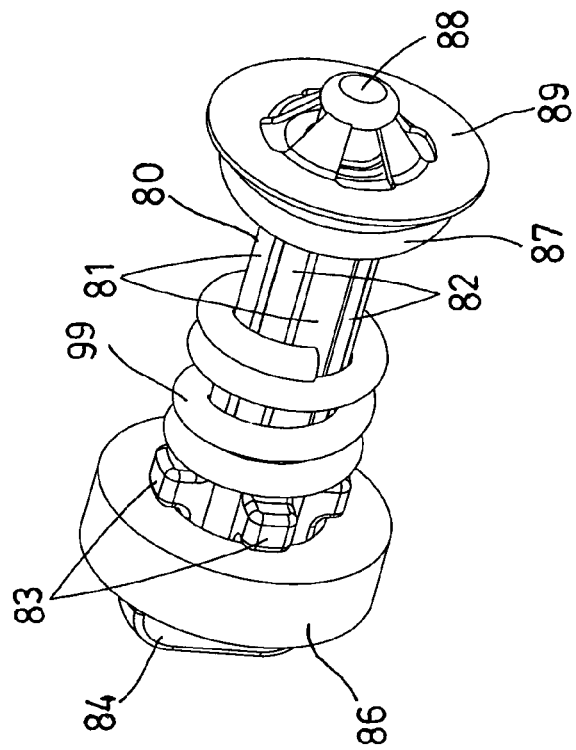
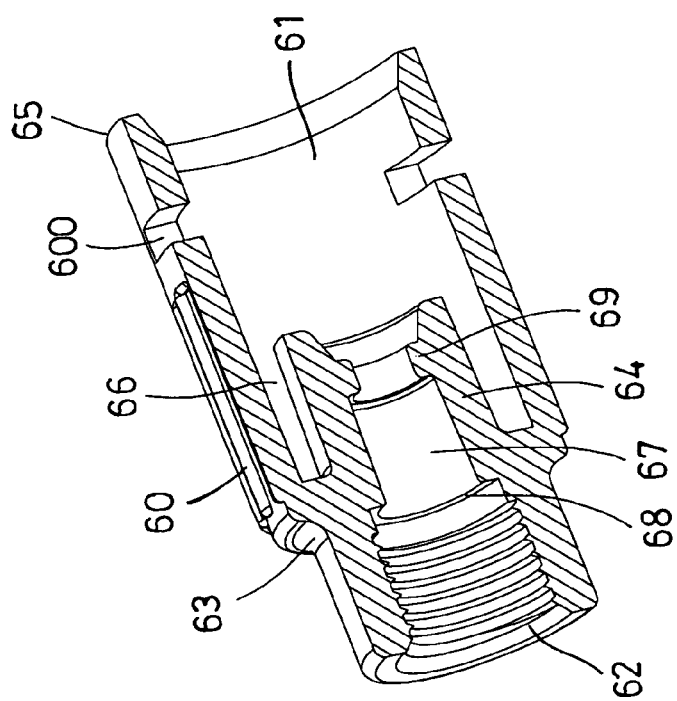
FIG. 14
FIG. 13

DEVICE FOR SEALING AND INFLATING INFLATABLE OBJECT

BACKGROUND OF THE INVENTION

1. Field of the Invention

The present invention relates to an air compressor or a sealing and inflating assembly for sealing and inflating an inflatable object, and more particularly to an air compressing device including an improved tire repairing container for quickly coupling and attaching and securing to an outlet tube of the air compressor and for quickly disengaging from the air compressor and for allowing the tire sealing preparation to be effectively supplied to seal and inflate the inflatable objects.

2. Description of the Prior Art

Various kinds of typical air compressing devices have been developed by the applicant and comprise a cylinder housing, a piston slidably received in the cylinder housing, and a motor coupled or attached to the cylinder housing and coupled to the piston for moving the piston relative to the cylinder housing in a reciprocating action, in order to generate a pressurized air of a greater air pressure and a decreased flowing quantity, and a pressure tight container for receiving a sealing preparation and for selectively supplying the sealing preparation to seal and inflate the inflatable objects, such as vehicle tires, air beds, air cushions, hovercrafts, etc.

For example, U.S. Pat. No. 6,176,285 to Gerresheim et al., U.S. Pat. No. 6,283,172 to Thurner, and U.S. Pat. No. 6,345,650 to Paasch et al. disclose several of the typical preparations for the sealing of tires with punctures, and repairing apparatuses for the sealing and pumping up of tires and tires with an integrated sealing preparation comprising a pressure tight container that is coupled to a pressurized air cartridge.

However, the pressure tight container and the pressurized air cartridge are coupled together with a shut off valve, a gas outlet, a gas inlet and may not be easily disengaged from each other, and an outlet valve and an additional riser tube are further required to be attached or mounted to the upper portion of the pressure tight container for allowing the sealing preparation to be selectively supplied to seal and inflate the inflatable objects, but may not be easily connected or coupled to the air compressor devices. In addition, the sealing preparation may not be easily forced to flow upwardly and out through the pressure tight container by the pressurized air particularly in the cold environment where the pressurized air may not easily flow through the sealing preparation.

U.S. Pat. No. 6,454,892 to Gerresheim et al. and U.S. Pat. No. 6,889,723 to Gerresheim et al. disclose two of the typical preparations for sealing punctured tires and apparatuses for the sealing and pumping up of tires, and each comprising a pressure tight container coupled to an air compressor, and a shut off valve and a gas inlet are coupled to the air compressor and the pressure tight container for supplying the pressurized air to force the sealing preparation to seal the inflatable objects.

However, the pressure tight container may not be easily removed from the air compressor, and the air compressor also may not be easily and quickly and directly coupled to the inflatable objects and to readily inflate the inflatable objects, such as tires, air beds, air cushions, hovercrafts, etc., in addition, the puncture sealant is required to flow out through the shut off valve and the outlet valve. Furthermore, the gas inlet may not be blocked or sealed and the sealing preparation may have a good chance to flow into the gas inlet.

U.S. Pat. No. 7,021,348 to Eriksen et al. discloses a further typical device for sealing and inflating an inflatable object and comprising a tubular container coupled to an air compressor, and a complicated coupling structure is further required for coupling the tubular container to the air compressor.

However, similarly, the tubular container may not be easily and quickly removed from the air compressor, and the air compressor may not be easily and quickly and directly coupled to the inflatable objects and to inflate the inflatable objects, in addition, the puncture sealant is required to flow through the complicated coupling structure. Furthermore, a complicated and expensive structure should be formed in the tubular container for separating the pressurized air from the sealing preparation.

U.S. Pat. No. 7,178,564 to Kojima et al. discloses a still further typical supplying/removing device of puncture sealant of tire and comprising a pressure resistant bottle coupled to an air compressor or a high pressure source, and a complicated coupling apparatus body is further required for coupling the pressure resistant bottle to the air compressor.

However, similarly, the pressure resistant bottle may not be easily removed from the air compressor, and the air compressor may not be easily and quickly and directly coupled to the inflatable objects and to inflate the inflatable objects, in addition, the puncture sealant is required to flow through the complicated coupling apparatus body, and the pressurized air should flow through the sticky or pasty sealing preparation, but the pressurized air may not easily flow through the sealing preparation particularly in the cold environment.

The present invention has arisen to mitigate and/or obviate the afore-described disadvantages of the conventional air compressor devices and/or sealing and inflating devices for sealing and inflating the inflatable objects.

SUMMARY OF THE INVENTION

The primary objective of the present invention is to provide a sealing and inflating assembly comprising an air compressing device including an improved tire repairing container for quickly coupling and attaching and securing to an outlet tube of the air compressor and for quickly disengaging from the air compressor and for allowing the tire sealing preparation to be effectively supplied to seal and inflate the inflatable objects.

The other objective of the present invention is to provide a sealing and inflating assembly for sealing and inflating an inflatable object comprising a tire repairing container that may be easily and quickly and changeably attached and secured to the outlet tube of the air compressor.

The further objective of the present invention is to provide a sealing and inflating assembly for sealing and inflating an inflatable object comprising a pipe for directing and guiding the pressurized air to flow into the compartment of the tire repairing container without flowing through the tire sealing preparation.

The still further objective of the present invention is to provide a sealing and inflating assembly for sealing and inflating an inflatable object comprising a control valve for preventing the sealing preparation from flowing into the inflatable objects inadvertently.

In accordance with one aspect of the invention, there is provided a sealing and inflating assembly comprising a receptacle, an air compressing device engaged in the receptacle for generating a pressurized air, and including an outlet tube, a tire repairing container including a compartment formed therein for receiving a sealing preparation, and including a mouth opening formed therein, an outlet piece attached to the mouth opening of the tire repairing container, and including an entrance for being in connection with the outlet tube of the cylinder housing, and including an inlet conduit formed therein and communicative with the entrance thereof for guiding the pressurized air to flow through the outlet piece and then into the compartment of the tire repairing container, and including an outlet conduit formed therein and communicative with the compartment of the tire repairing container for allowing the sealing preparation in the compartment of the tire repairing container to selectively flow out through the outlet conduit of the outlet piece, and a pipe disposed in the compartment of the tire repairing container, and including a first end coupled to the outlet piece, and including a bore formed therein and communicative with the inlet conduit of the outlet piece for directing and guiding the pressurized air to flow through the bore of the pipe and to flow into a base portion of the compartment of the tire repairing container, and including a second end, and a space being formed in the base portion of the compartment of the tire repairing container when the tire repairing container is disposed upside down, and a height between the second end of the pipe and the mouth opening of the tire repairing container being greater than a height between a fluid level of the sealing preparation and the mouth opening of the tire repairing container when the tire repairing container is disposed upside down and when the mouth opening of the tire repairing container and the outlet piece are located at a lower portion of the tire repairing container for allowing the air to directly flow into the base portion of the compartment of the tire repairing container without flowing through the sealing preparation.

The receptacle includes a socket opening formed therein, and the outlet tube is extended into the socket opening of the receptacle. The outlet piece includes a protruded stud extended therein for forming a peripheral chamber in the outlet piece and around the stud, the inlet conduit is formed through the stud and separated from the peripheral chamber of the outlet piece.

The first end of the pipe is coupled to the stud of the outlet piece, and the bore of the pipe is communicative with the inlet conduit of the outlet piece. The pipe includes a peripheral fence for engaging into the peripheral chamber of the outlet piece and for securing to the outlet piece.

The pipe includes a peripheral rib extended from the peripheral fence for engaging into the peripheral chamber of the outlet piece and for being anchored between the outlet piece and the mouth opening of the tire repairing container.

The outlet piece includes a washer engaged between the mouth opening of the tire repairing container and the peripheral rib of the pipe for making a seal between the mouth opening of the tire repairing container and the outlet piece.

The pipe includes a peripheral space formed in the peripheral fence of the pipe for forming a peripheral flange between the pipe and the peripheral fence, and includes at least one orifice formed in the peripheral flange and communicative with the peripheral space of the pipe and communicative with the peripheral chamber of the outlet piece for allowing the sealing preparation to selectively flow through the orifice and the peripheral space of the pipe and to flow out through the outlet conduit of the outlet piece.

The pipe includes a gasket releasably engaged in the peripheral space of the pipe for selectively blocking the orifice of the pipe, and the orifice of the pipe is opened when the gasket is disengaged from the peripheral space of the pipe and engaged into the peripheral chamber of the outlet piece.

The pipe includes a cap releasably attached to the second end of the pipe. A hose may further be provided and connected to the outlet conduit of the outlet piece, and an adapter attached to the hose for engaging with a tire valve. The adapter includes a housing, a valve stem slidably engaged in the housing, and a sealing member attached to the valve stem for selectively engaging with the housing.

The housing includes a chamber formed therein, and includes a first end portion for selectively engaging with the tire valve, and includes a cylindrical member extended inwardly from the first end portion and extended into the chamber of the housing for forming an inner peripheral channel between the cylindrical member and the housing, a connector includes a compartment formed therein for engaging with the cylindrical member and for engaging into the inner peripheral channel of the housing.

The housing includes at least one lock notch formed therein, and a latch member engaged onto the connector and engaged into the chamber of the housing and having at least one catch for engaging with the lock notch of the housing and for locking the connector to the housing.

The housing includes a peripheral swelling extended inwardly from the cylindrical member for selectively engaging with the sealing member of the valve stem. The housing includes a screw hole formed therein, and includes a bore formed in the cylindrical member and having an inner diameter smaller than an inner diameter of the screw hole of the housing for forming a peripheral shoulder between the screw hole of the housing and the bore of the cylindrical member.

The connector includes an extension extended out of the housing. The valve stem includes a spring-biasing member engaged between the valve stem and the cylindrical member for biasing the sealing member to engage with the cylindrical member and to selectively block the cylindrical member. The valve stem includes at least one longitudinal rib for forming at least one longitudinal slot, and includes a retaining ring engaged with said sealing member.

Further objectives and advantages of the present invention will become apparent from a careful reading of the detailed description provided hereinbelow, with appropriate reference to the accompanying drawings.

BRIEF DESCRIPTION OF THE DRAWINGS

FIGS. 13, 14 are partial perspective views of the control valve device or adapter of the sealing and inflating assembly.

DETAILED DESCRIPTION OF THE PREFERRED EMBODIMENT

Figure 1:
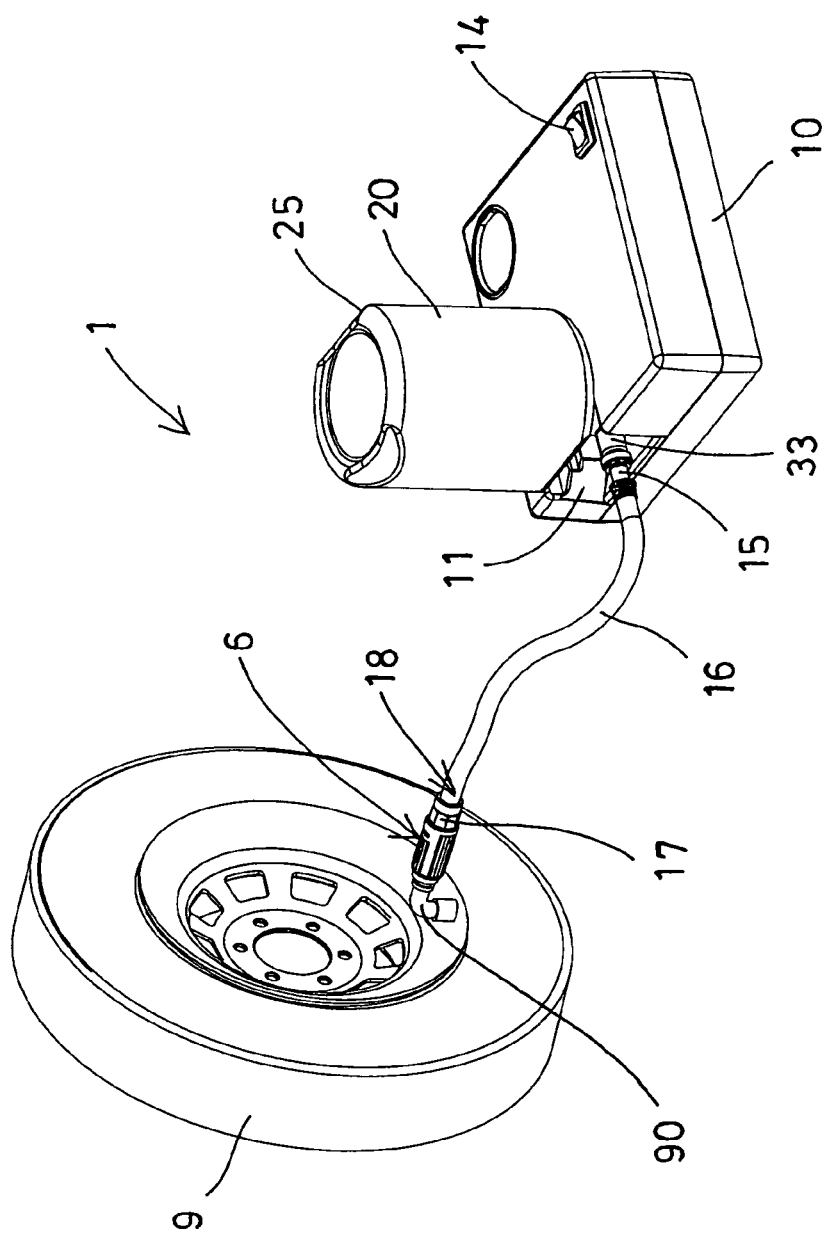
FIG. 1 is a perspective view of a sealing and inflating assembly in accordance with the present invention.
Figure 2:
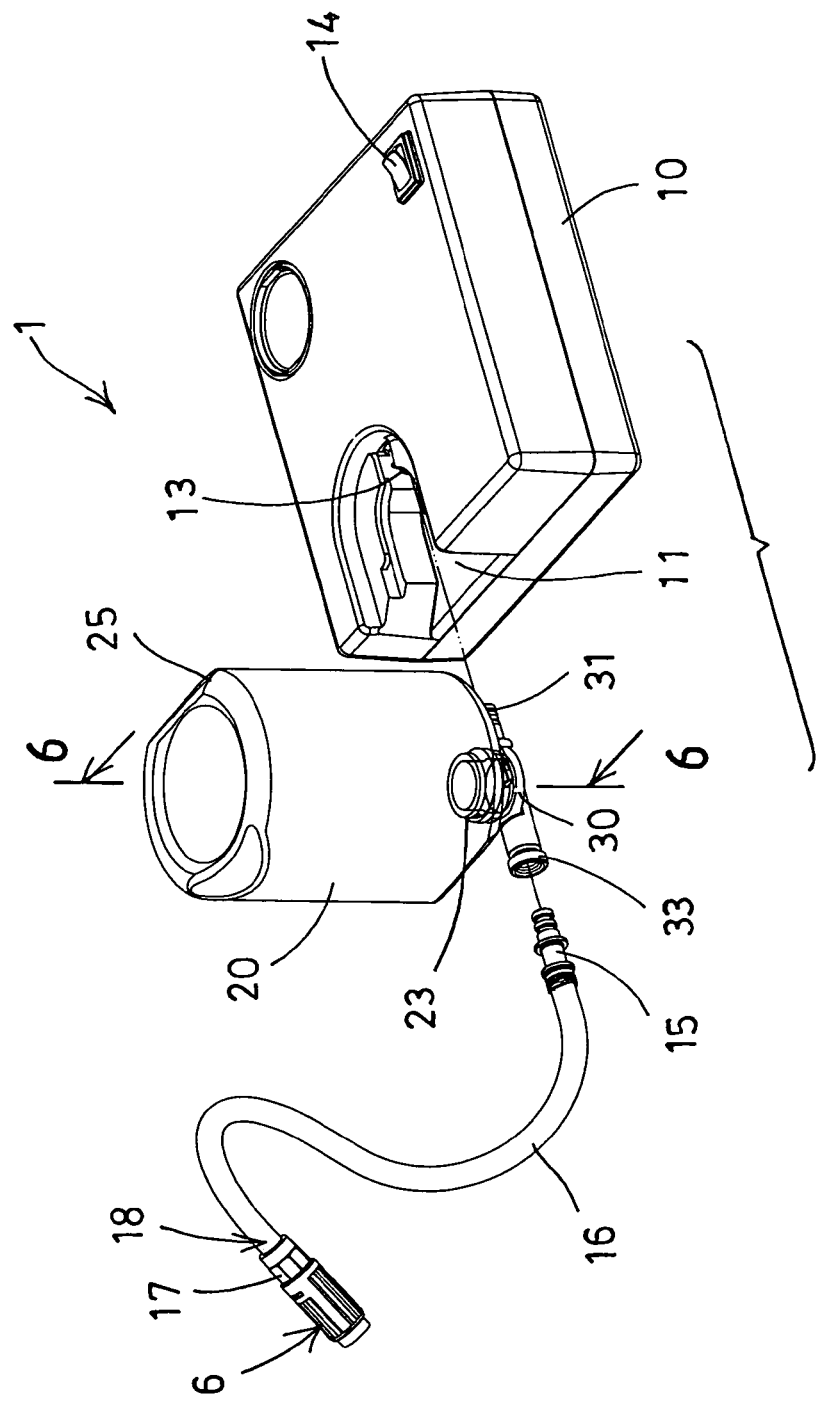
FIG. 2 is a partial exploded view of the sealing and inflating assembly.
Figure 3:
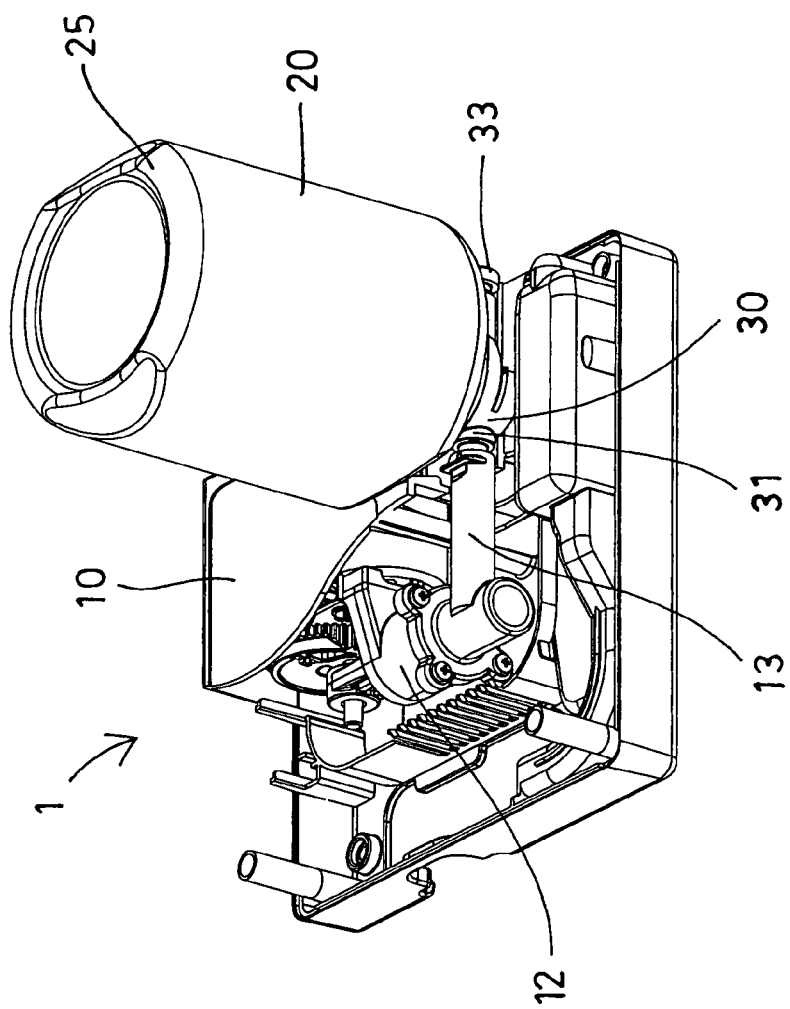
FIG. 3 is another perspective view of the tire repairing container of the sealing and inflating assembly, in which a portion of the sealing and inflating assembly has been cut off for showing the inner structure of the sealing and inflating assembly.

Referring to the drawings, and initially to FIGS. 1-3, a sealing and inflating assembly 1 in accordance with the present invention comprises a receptacle 10 including a socket opening 11 formed therein, an air compressing device 12 disposed or received or engaged into the receptacle 10 and including an outlet tube 13 extended outwardly therefrom and partially extended into the socket opening 11 of the receptacle 10, and a control switch 14 electrically connected or coupled to the air compressing device 12 for controlling or operating the air compressing device 12 to selectively generate a pressurized air of a relatively greater air pressure and a decreased flowing quantity. The above-described structure is typical and will not be described in further details.

Several examples of the typical air compressing devices or sealing and inflating devices are disclosed in the cited prior U.S. patents which may be taken as the references for the present invention. For example, the pressurized air is provided for being supplied to inflate various air facilities or inflatable objects 9, such as tires 9 (FIG. 1), air beds, air cushions, hovercrafts, etc. A tire repairing container 20 is further provided and includes a compartment 21 formed therein (FIGS. 5-9) for receiving a sealing preparation 22 and for selectively supplying the sealing preparation 22 to seal and inflate the inflatable objects 9, such as vehicle tires 9, air beds, air cushions, hovercrafts, etc., and includes a mouth opening 23 formed or provided on the upper or lower portion of the tire repairing container 20 (FIG. 5) for filling or discharging the sealing preparation 22 into or from the compartment 21 of the tire repairing container 20.

The tire repairing container 20 further includes an outlet mouth or piece 30 attached and secured to the mouth opening 23 of the tire repairing container 20 with latches or fasteners (not shown), adhesive materials or threading engagements 24, for blocking or enclosing the mouth opening 23 of the tire repairing container 20 and for confining and retaining the sealing preparation 22 within the compartment 21 of the tire repairing container 20. Normally, the sealing preparation 22 has not been fully filled within the compartment 21 of the tire repairing container 20, and a space 26 will be formed in a base portion 25 of the compartment 21 of the tire repairing container 20 when the tire repairing container 20 is disposed upside down, best shown in FIGS. 6-9, or when the mouth opening 23 and the outlet piece 30 are located at the lower portion of the tire repairing container 20. A gasket or washer 29 is preferably provided and attached or mounted or engaged between the mouth opening 23 and the outlet piece 30 for making a water or fluid tight seal between the mouth opening 23 and the outlet piece 30.

The outlet piece 30 will be engaged into the socket opening 11 of the receptacle 10 and includes an entrance 31 for attaching or securing or coupling to the outlet tube 13 and for allowing the pressurized air from the air compressing device 12 to be suitably supplied to the outlet piece 30 and then into the compartment 21 of the tire repairing container 20, and includes an inlet conduit 32 formed therein and communicative with the entrance 31 thereof for suitably guiding the pressurized air to flow through the outlet piece 30 and then into the compartment 21 of the tire repairing container 20. The outlet piece 30 further includes an outlet conduit 33 formed therein and communicative with the compartment 21 of the tire repairing container 20, but offset from the entrance 31 thereof for allowing the sealing preparation 22 in the compartment 21 of the tire repairing container 20 to selectively flow out through the outlet conduit 33 of the outlet piece 30, for example, the outlet conduit 33 of the outlet piece 30 may be coupled to the air facilities or inflatable objects 9, such as tires 9, air beds, air cushions, hovercrafts, etc. with a coupler 15 and a hose 16, and thus for allowing the pressurized air to be suitably supplied into the compartment 21 of the tire repairing container 20, and then to force the sealing preparation 22 in the compartment 21 of the tire repairing container 20 to flow to and to inflate the inflatable objects 9 or vehicle tires 9 or the like.

As shown in FIGS. 4-9, the outlet piece 30 includes a protruded stud 34 extended therein for forming or defining a peripheral chamber 35 within the outlet piece 30 and around the stud 34, in which the inlet conduit 32 is formed through the stud 34 and offset or separated from the peripheral chamber 35 of the outlet piece 30 for suitably guiding the pressurized air to flow through the inlet conduit 32 of the outlet piece 30 and then to flow into the compartment 21 of the tire repairing container 20, and the peripheral chamber 35 of the outlet piece 30 is communicative with the outlet conduit 33 of the outlet piece 30 for suitably guiding the sealing preparation 22 in the compartment 21 of the tire repairing container 20 to selectively and to suitably flow out through the outlet conduit 33 of the outlet piece 30.

Figure 4:
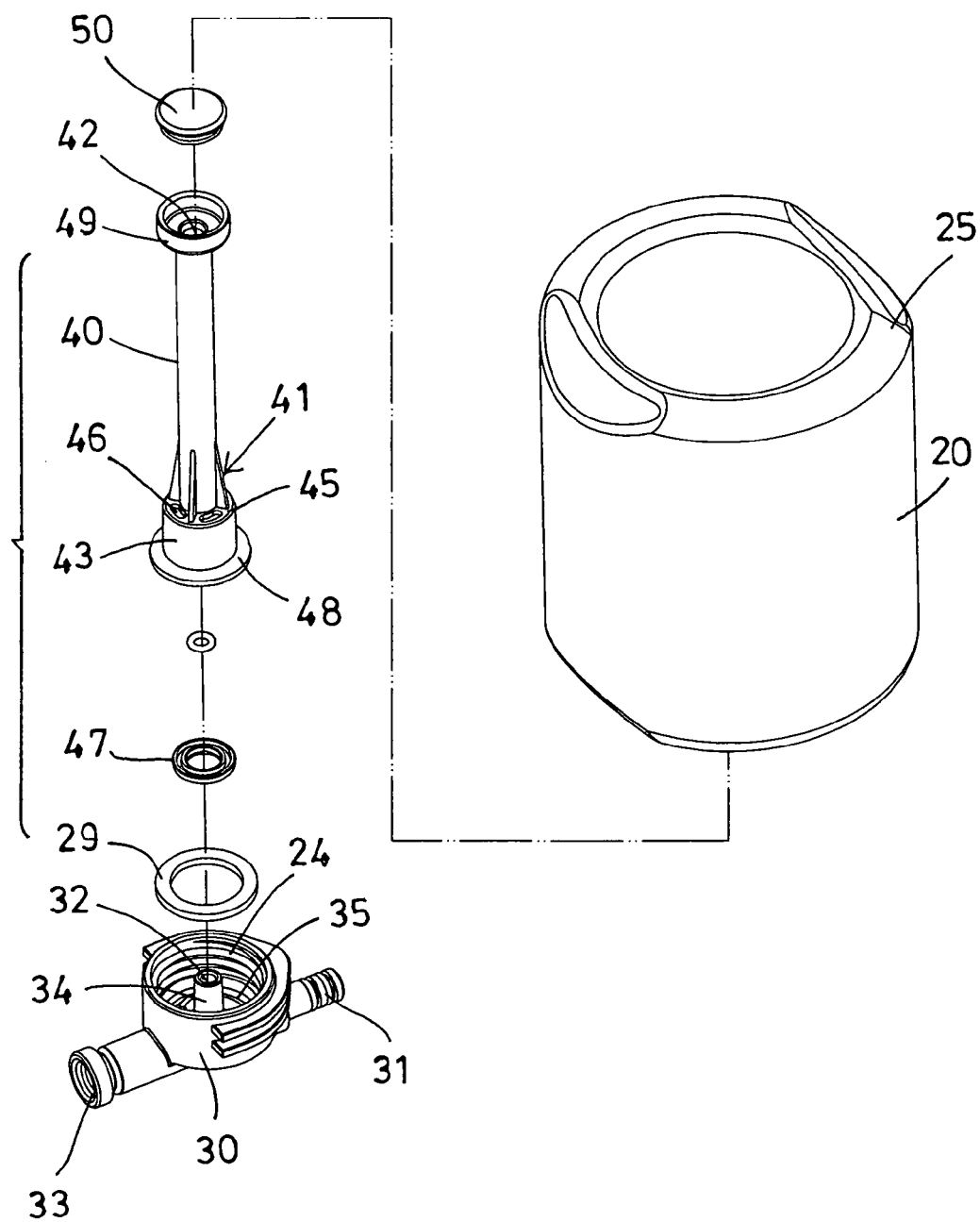
FIG. 4 is another partial exploded view of the tire repairing container of the sealing and inflating assembly.
Figure 5:
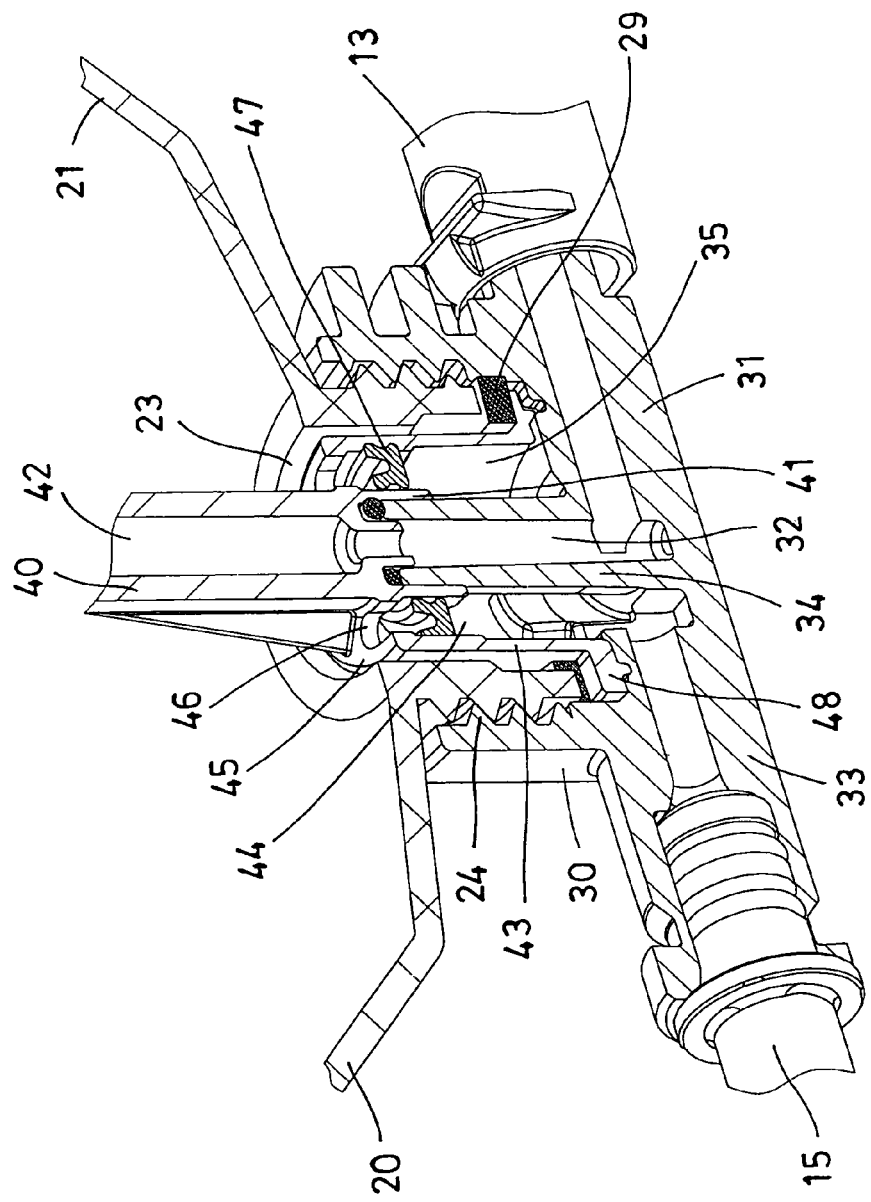
FIG. 5 is a partial perspective view of the tire repairing container of the sealing and inflating assembly, in which a portion of the sealing and inflating assembly has been cut off for showing the inner structure of the sealing and inflating assembly.

As also shown in FIGS. 4-9, and particularly in FIGS. 4-5, a pipe 40 is disposed in the compartment 21 of the tire repairing container 20, and includes one or lower portion or first end 41 attached or mounted or secured or coupled to the inlet conduit 32 of the outlet piece 30, such as attached or mounted or secured or coupled to the stud 34, and includes a bore 42 formed therein and communicative with the inlet conduit 32 of the outlet piece 30 for directing or guiding the pressurized air to flow through the bore 42 of the pipe 40 and then to flow into the lower or the upper or the base portion 25 of the compartment 21 of the tire repairing container 20, best shown in FIGS. 6-9. The pipe 40 includes an enlarged peripheral skirt or fence 43 formed or extended from the lower portion or first end 41 thereof for forming a peripheral space 44 within the lower portion or first end 41 or the peripheral fence 43 of the pipe 40 and for forming a peripheral shoulder or flange 45 between the pipe 40 and the peripheral fence 43.

The pipe 40 includes one or more orifices 46 formed therein, such as formed in the peripheral flange 45 thereof and communicative with the peripheral space 44 of the pipe 40 and also communicative with the peripheral chamber 35 of the outlet piece 30 which is communicative with the outlet conduit 33 of the outlet piece 30 for allowing the sealing preparation 22 in the compartment 21 of the tire repairing container 20 to selectively and to suitably flow through the orifices 46 and the peripheral space 44 of the pipe 40 and to flow out through the outlet conduit 33 of the outlet piece 30. The width of the peripheral space 44 of the pipe 40 is smaller than that of the peripheral chamber 35 of the outlet piece 30 for receiving or engaging with a sealing ring or gasket 47 which may releasably or temporarily block or seal the orifices 46 of the pipe 40 (FIGS. 5-8).

When the gasket 47 is forced to move into the relatively enlarged peripheral chamber 35 of the outlet piece 30 (FIG. 9), the orifices 46 of the pipe 40 may be opened and the sealing preparation 22 may be forced to flow through the orifices 46 and the peripheral space 44 of the pipe 40 and to flow out through the outlet conduit 33 of the outlet piece 30. The pipe 40 includes a peripheral rib 48 extended radially and outwardly therefrom, such as from the fence 43 for engaging into the peripheral chamber 35 of the outlet piece 30 and for being sandwiched or anchored or secured or retained between the outlet piece 30 and the mouth opening 23 of the tire repairing container 20 for solidly and stably anchoring or securing or retaining the pipe 40 to or between the outlet piece 30 and the tire repairing container 20. The washer 29 is engaged between the mouth opening 23 and the peripheral rib 48 of the pipe 40 for making a water or fluid tight seal between the mouth opening 23 and the outlet piece 30. The pipe 40 includes an upper or inner portion 49 releasably or temporarily blocked or sealed by a cap 50.

Figure 6:
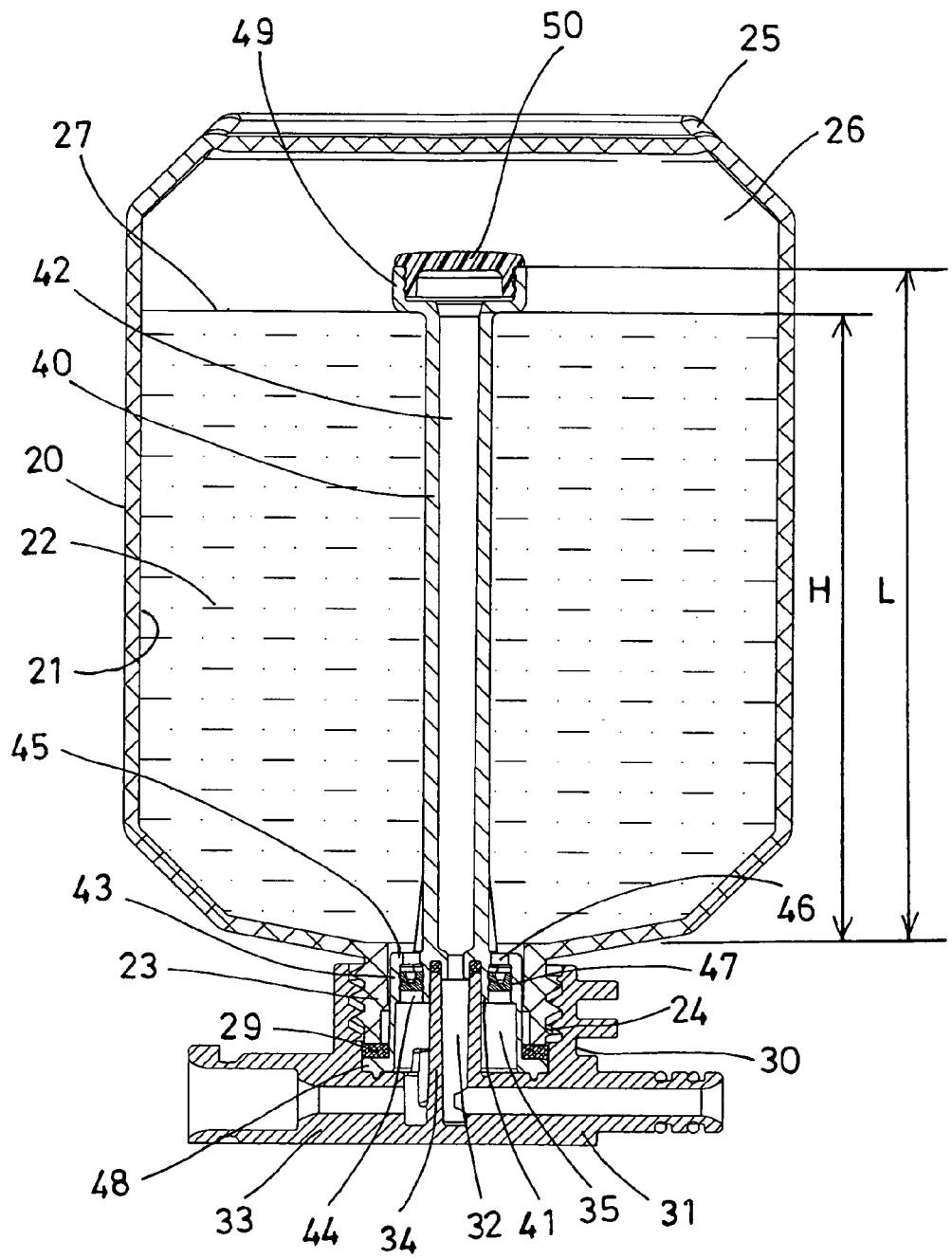
FIG. 6 is a partial cross sectional view illustrating a tire repairing container of the sealing and inflating assembly, taken along lines 6-6 of FIG. 2.
Figure 7:
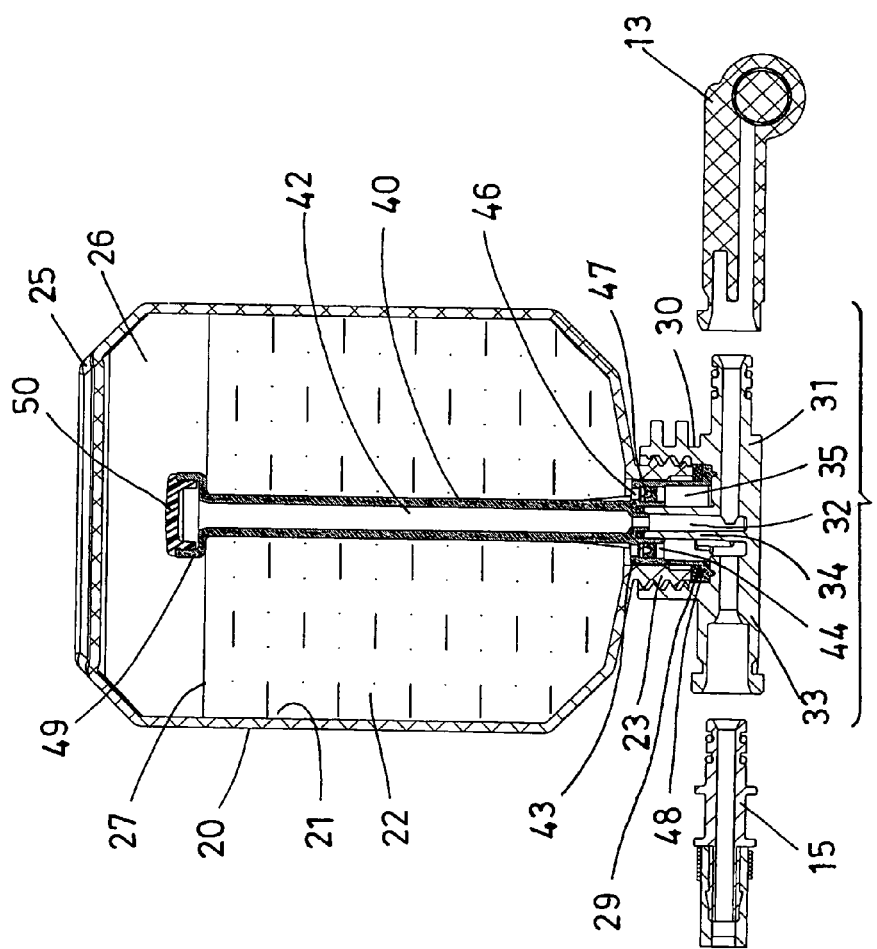
FIGS. 7, 8, 9 are partial cross sectional views similar to FIG. 6, illustrating the operation of the sealing and inflating assembly.
Figure 8:
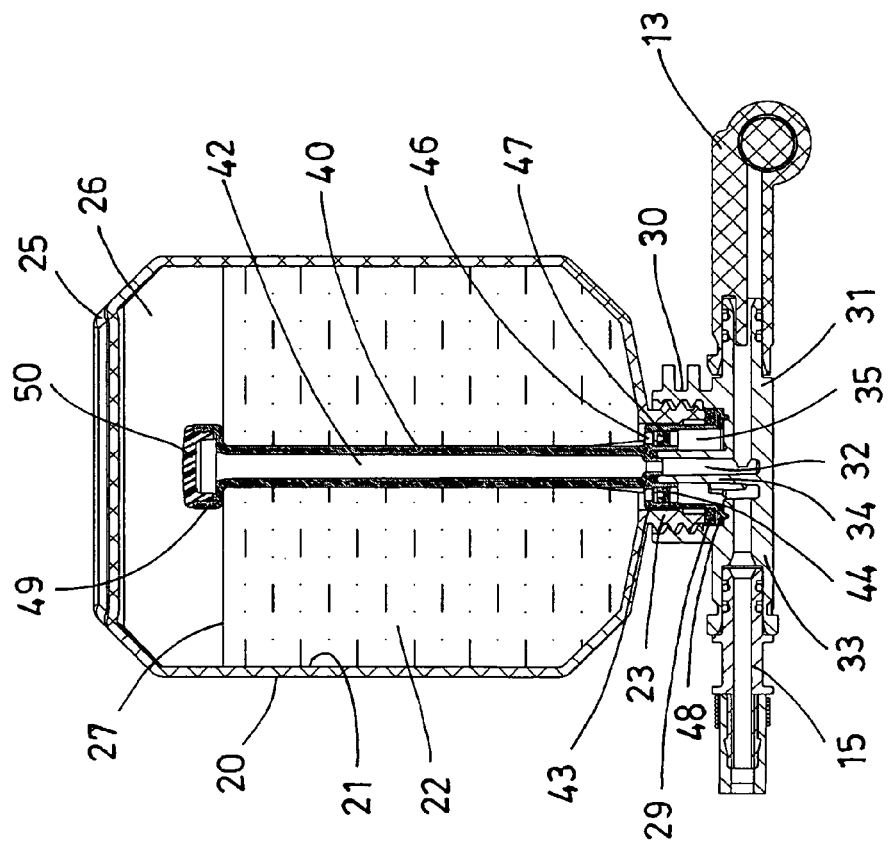
Figure 9:
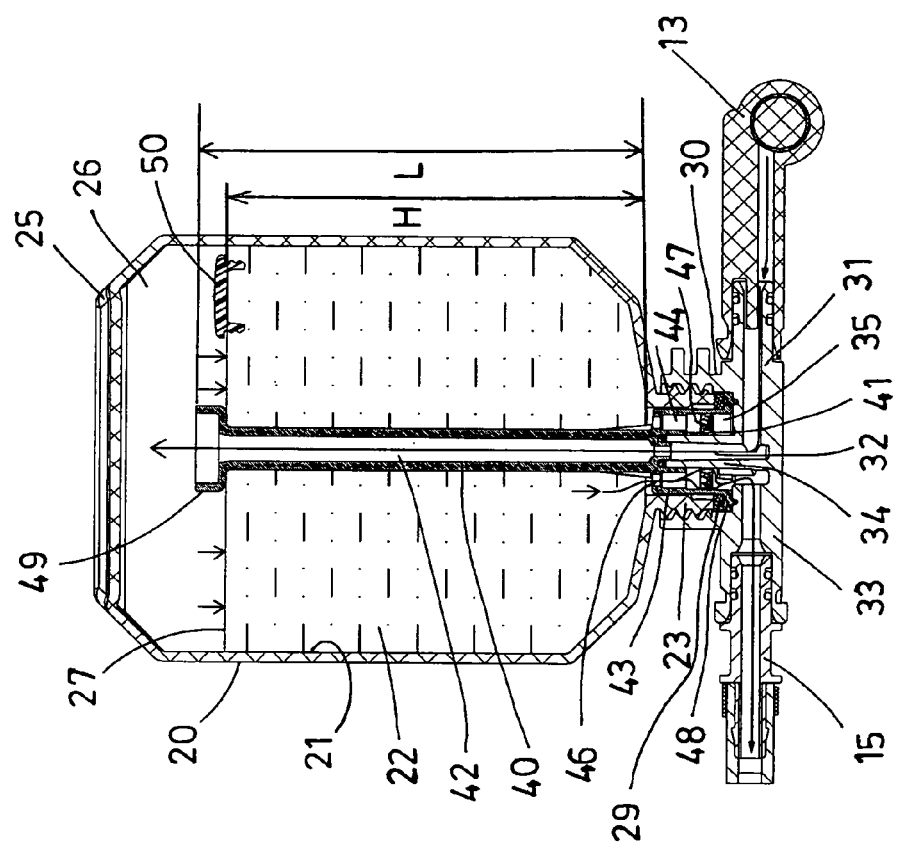

Before using, the outlet piece 30 may be disposed or located above the tire repairing container 20, and the bore 42 of the pipe 40 may be releasably or temporarily blocked or sealed by the cap 50 for preventing the sealing preparation 22 from flowing into the bore 42 of the pipe 40, and the orifices 46 of the pipe 40 may also be releasably or temporarily blocked or sealed by the gasket 47 for preventing the sealing preparation 22 from flowing out through the outlet conduit 33 of the outlet piece 30. As shown in FIGS. 1-9, the outlet piece 30 will be disposed or located below the tire repairing container 20 when in use. At this moment, as shown in FIGS. 6 and 9, the height "L" between the inner portion 49 of the pipe 40 and the mouth opening 23 of the tire repairing container 20 is greater than the height "H" between the fluid level 27 of the sealing preparation 22 and the mouth opening 23 of the tire repairing container 20; i.e., the inner portion 49 of the pipe 40 is located above the fluid level 27 of the sealing preparation 22 and is exposed such that the pressurized air may directly flow out through the bore 42 of the pipe 40 without flowing through the sealing preparation 22.

In operation, as shown in FIG. 9, when the pressurized air is supplied and flows from the outlet tube 13 into the entrance 31 and the inlet conduit 32 of the outlet piece 30, the pressurized air may flow through the bore 42 of the pipe 40 to move or disengage the cap 50 from the pipe 40 and may flow into the space 26 that is formed in the base portion 25 of the compartment 21 of the tire repairing container 20 without flowing through the sealing preparation 22, and the pressurized air may force the sealing preparation 22 to flow through the orifices 46 of the pipe 40 and to move or disengage the gasket 47 from the pipe 40 and into the peripheral chamber 35 of the outlet piece 30, and the sealing preparation 22 may then flow out through the outlet conduit 33 of the outlet piece 30.

As shown in FIGS. 1 and 2, another coupler or lock sleeve 17 is attached or mounted to the other end 18 of the hose 16 for attaching or mounting or securing or coupling a control valve device or adapter 6 to the inflation or tire valve 90 of the inflatable object or vehicle tire 9. As shown in FIGS. 10-11, 13, and 15, the control valve device or adapter 6 includes a housing 60 having a chamber 61 formed therein, and includes a threaded or screw hole 62 formed therein, such as formed in the one end portion 63 of the housing 60 for selectively threading or engaging with the tire valve 90 of the inflatable object or vehicle tire 9, and includes a barrel or cylindrical member 64 extended inwardly from the one end portion 63 of the housing 60 and extended into the chamber 61 of the housing 60, and the cylindrical member 64 does not fully extended toward the other end portion 65 of the housing 60 and includes an outer diameter smaller than an inner diameter of the housing 60 for forming or defining an inner peripheral channel 66 between the cylindrical member 64 and the housing 60.

Figure 10:
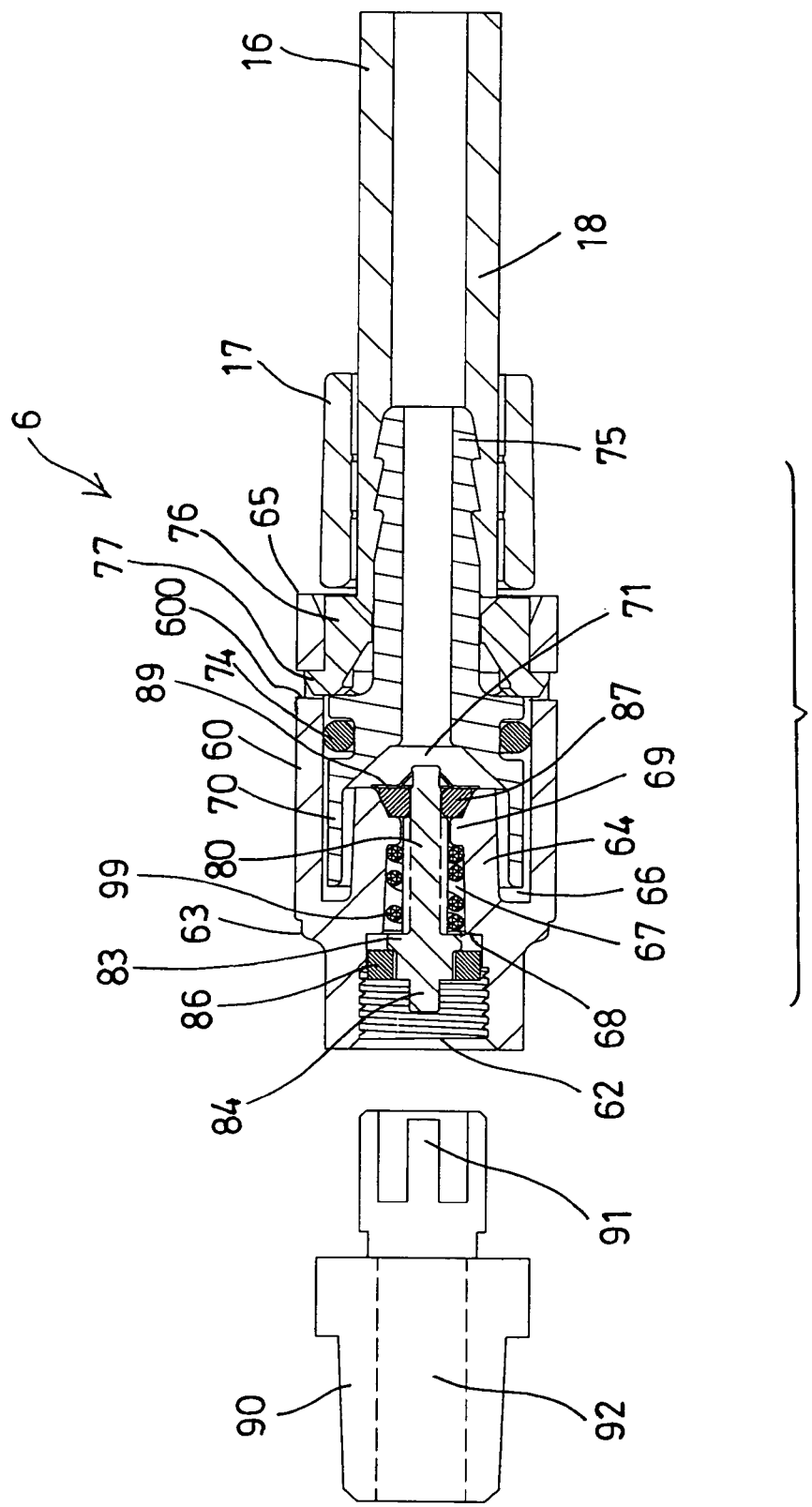
FIG. 10 is a partial cross sectional and exploded view, illustrating a control valve device or adapter of the sealing and inflating assembly.
Figure 11:
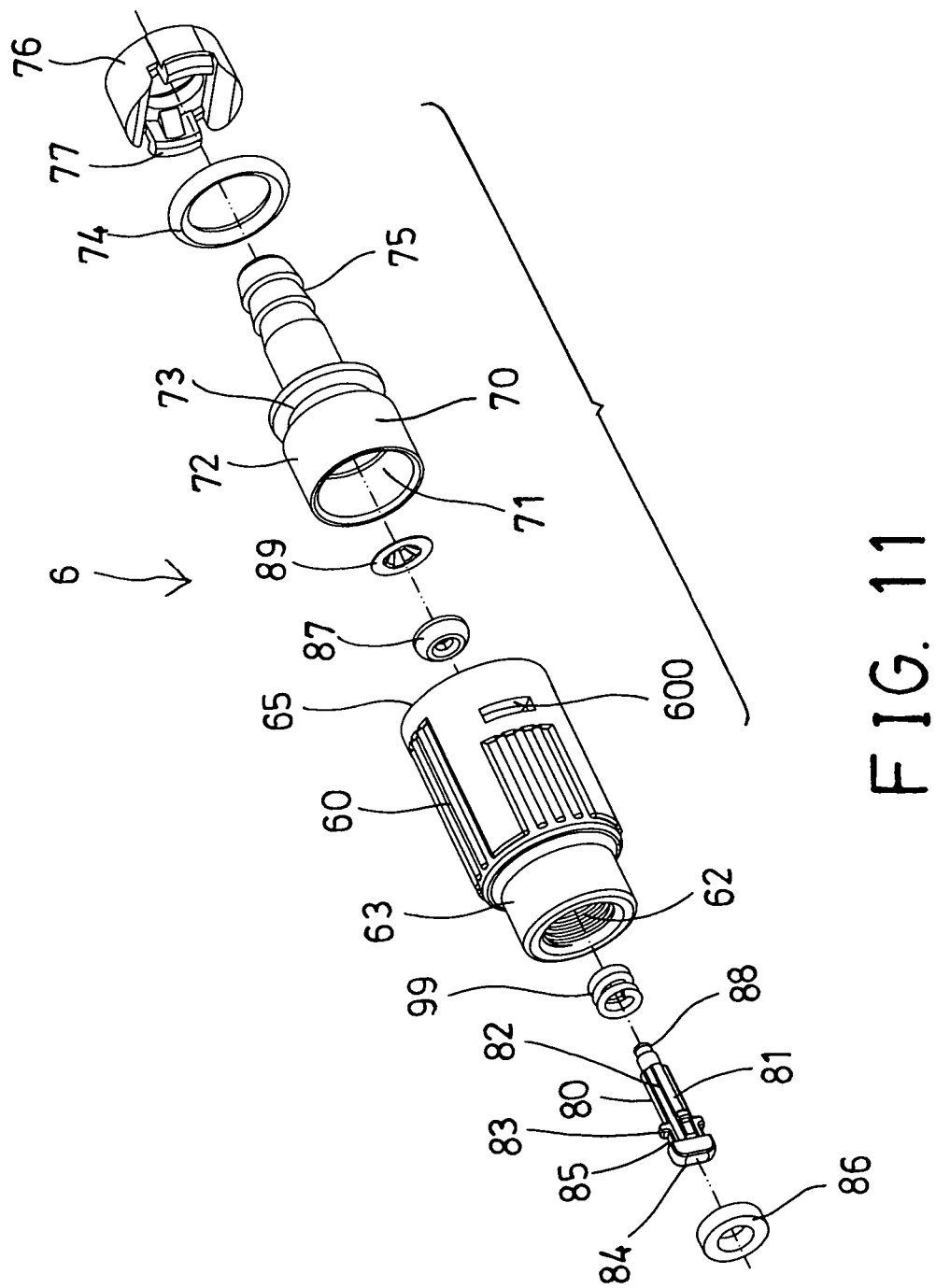
FIGS. 11, 12 are partial exploded views of the control valve device or adapter of the sealing and inflating assembly.
Figure 12:
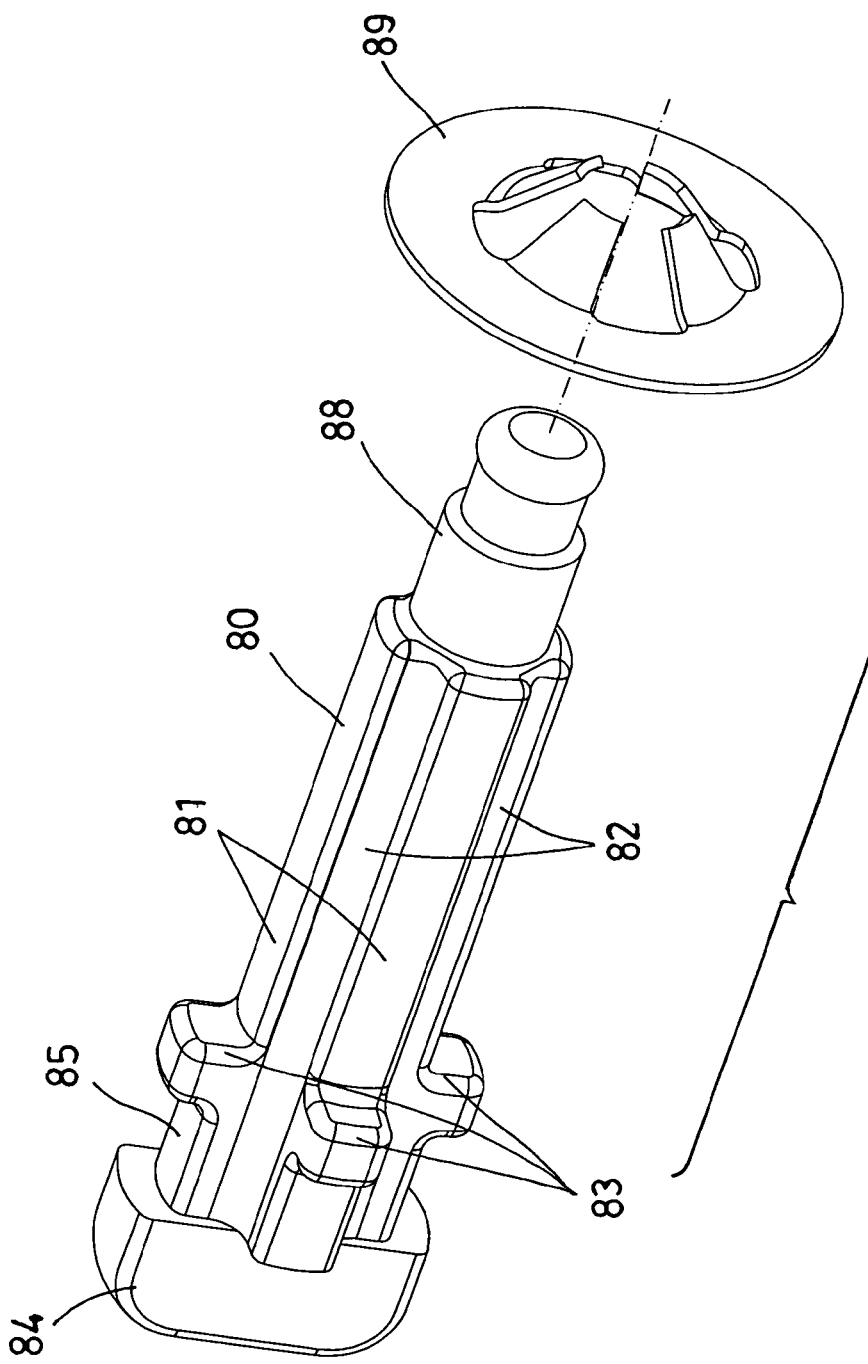
Figure 15:
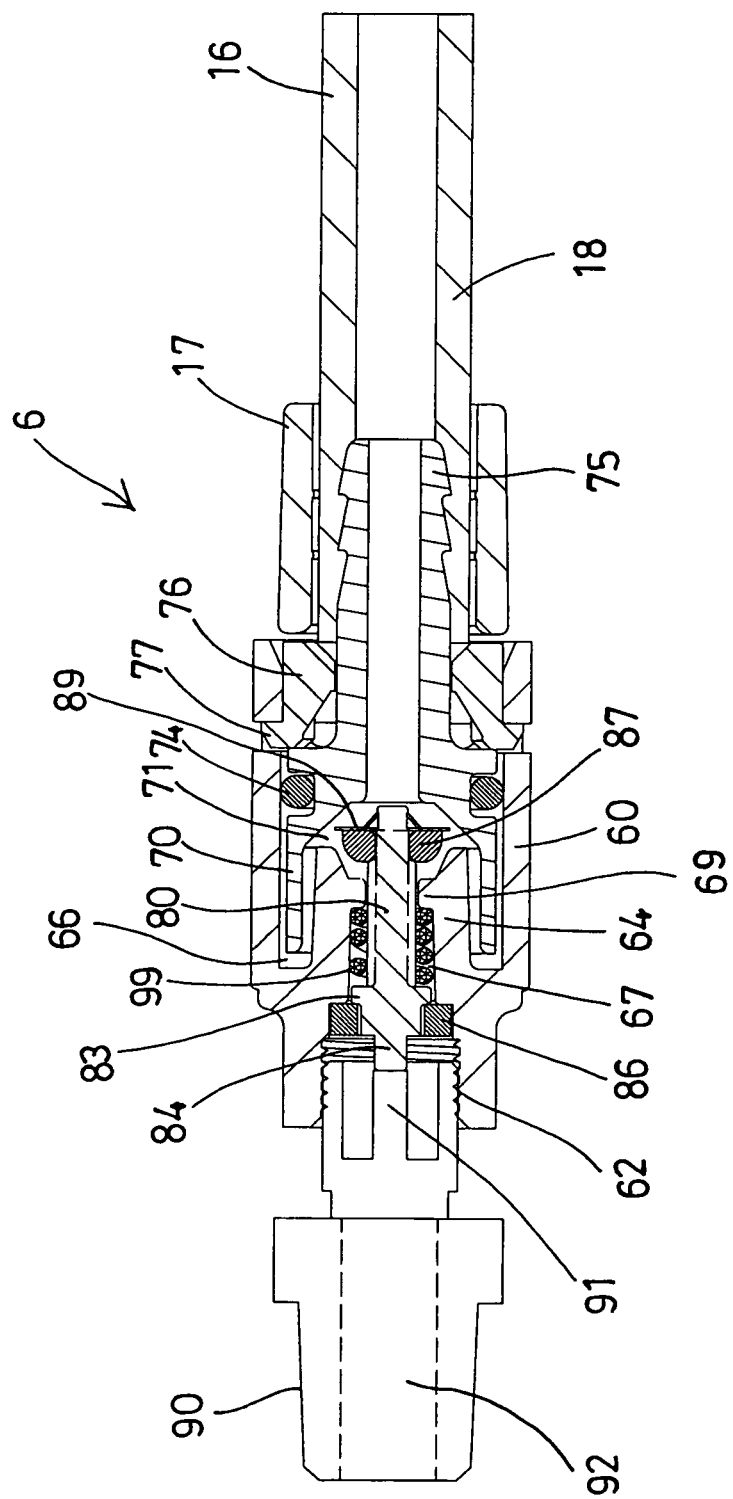
FIG. 15 is a partial cross sectional view illustrating the operation of the control valve device or adapter of the sealing and inflating assembly.

The cylindrical member 64 includes a bore 67 having an inner diameter smaller than an inner diameter of the screw hole 62 of the housing 60 for forming or defining a peripheral shoulder 68 between the screw hole 62 of the housing 60 and the bore 67 of the cylindrical member 64, and includes a peripheral swelling 69 extended radially and inwardly therefrom, and the housing 60 includes one or more lock notches 600 formed therein, such as formed in the outer peripheral portion thereof. As shown in FIGS. 10-11, and 15, the adapter 6 further includes a connector 70 having a compartment 71 formed therein, such as formed in the one end portion 72 of the connector 70 for receiving or engaging with the cylindrical member 64 of the housing 60 and for engaging into the inner peripheral channel 66 of the housing 60, the connector 70 includes an outer peripheral groove 73 formed therein for receiving or engaging with a sealing ring 74 which may be engaged with the housing 60 for making a water or fluid tight seal between the housing 60 and the connector 70.

The connector 70 further includes a serrated or toothed extension 75 extended axially and outwardly therefrom and extended out of the housing 60 for engaging into the other end 18 of the hose 16 and for solidly and stably attaching or mounting or securing to the hose 16 with the lock sleeve 17. A lock or latch member 76 is engaged onto the extension 75 of the connector 70 and engaged into the chamber 61 of the housing 60 for engaging with the connector 70, and includes one or more lock ears or catches 77 for engaging with the lock notches 600 of the housing 60 and for solidly and stably attaching or mounting or securing or locking or retaining the connector 70 to the housing 60. As shown in FIGS. 10-11, and 14-15, the adapter 6 further includes a valve stem 80 slidably received or engaged in the bore 67 of the cylindrical member 64 of the housing 60, and the valve stem 80 includes one or more longitudinal ribs 81 extended radially and outwardly therefrom for forming or defining one or more longitudinal slots 82 in the outer peripheral portion thereof.

The valve stem 80 further includes one or more projections 83 extended radially and outwardly therefrom, such as extended radially and outwardly from the inner portion of the longitudinal ribs 81 for forming or defining a peripheral recess or seat 85 between one end portion 84 of the valve stem 80 and the projections 83 and for snugly receiving or engaging with a cushioning member or gasket 86 which will be disposed or engaged between the valve stem 80 and the housing 60. A gasket or sealing ring or sealing member 87 is attached or mounted or secured to the other end 88 of the valve stem 80 and with a retaining ring 89 for selectively engaging with the peripheral swelling 69 of the cylindrical member 64 or of the housing 60 (FIG. 10) and for selectively blocking or enclosing the bore 67 of the cylindrical member 64. A spring-biasing member 99 is disposed or attached or mounted or engaged onto the valve stem 80 and engaged between the projections 83 of the valve stem 80 and the peripheral swelling 69 of the cylindrical member 64 or of the housing 60 for biasing or forcing the sealing member 87 to engage with the peripheral swelling 69 of the cylindrical member 64 or of the housing 60 and to selectively block or enclose the bore 67 of the cylindrical member 64.

In operation, as shown in FIG. 10, the sealing member 87 may be biased or forced to engage with the peripheral swelling 69 of the cylindrical member 64 or of the housing 60 and to block the bore 67 of the cylindrical member 64 and to prevent the sealing preparation 22 from flowing out through the cylindrical member 64 of the housing 60 inadvertently. As shown in FIG. 15, when the adapter 6 is engaged onto the tire valve 90, the tire valve 90 normally includes an actuation pin 91 for selectively engaging with the one end portion 84 of the valve stem 80 and for selectively forcing or moving the valve stem 80 onto the spring-biasing member 99 and for selectively moving or disengaging the sealing member 87 from the peripheral swelling 69 of the cylindrical member 64 or of the housing 60 and for opening the bore 67 of the cylindrical member 64 and for allowing the sealing preparation 22 to flow into the bore 67 of the cylindrical member 64 and to selectively flow through the slots 82 of the valve stem 80 and to flow into the screw hole 62 of the housing 60 and then to flow into an entrance 92 of the tire valve 90.

Accordingly, the sealing and inflating assembly includes an air compressing device including an improved tire repairing container for quickly coupling and attaching and securing to an outlet tube of the air compressor and for quickly disengaging from the air compressor and for allowing the tire sealing preparation to be effectively supplied to seal and inflate the inflatable objects, and for easily and quickly and changeably attaching and securing to the outlet tube of the air compressor.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A sealing and inflating assembly comprising:
   a receptacle,
   an air compressing device engaged in said receptacle for generating a pressurized air, and including an outlet tube,
   a tire repairing container including a compartment formed therein for receiving a sealing preparation, and including a mouth opening formed therein,
   an outlet piece attached to said mouth opening of said tire repairing container, and including an entrance for being in connection with said outlet tube of said air compressing device, and including an inlet conduit formed therein and communicative with said entrance thereof for guiding the pressurized air to flow through said outlet piece and then into said compartment of said tire repairing container, and including an outlet conduit formed therein and communicative with said compartment of said tire repairing container for allowing the sealing preparation in said compartment of said tire repairing container to selectively flow out through said outlet conduit of said outlet piece, and said outlet piece including a protruded stud extended therein for forming a peripheral chamber in said outlet piece and around said stud, said inlet conduit being formed through said stud and separated from said peripheral chamber of said outlet piece, and
   a pipe disposed in said compartment of said tire repairing container, and including a first end coupled to said outlet piece, and including a bore formed therein and communicative with said inlet conduit of said outlet piece for directing and guiding the pressurized air to flow through said bore of said pipe and to flow into a base portion of said compartment of said tire repairing container, and including a second end, and said pipe including a peripheral fence for engaging into said peripheral chamber of said outlet piece and for securing to said outlet piece, and said pipe including a peripheral space formed in said peripheral fence of said pipe for forming a peripheral flange between said pipe and said peripheral fence, and including at least one orifice formed in said peripheral flange and communicative with said peripheral space of said pipe and communicative with said peripheral chamber of said outlet piece for allowing the sealing preparation to selectively flow through said at least one orifice and said peripheral space of said pipe and to flow out through said outlet conduit of said outlet piece, and
   a space being formed in said base portion of said compartment of said tire repairing container when said tire repairing container is disposed upside down, and a height between said second end of said pipe and said mouth opening of said tire repairing container being greater than a height between a fluid level of the sealing preparation and said mouth opening of said tire repairing container when said tire repairing container is disposed upside down and when said mouth opening of said tire repairing container and said outlet piece are located at a lower portion of said tire repairing container for allowing the air to directly flow into said base portion of said compartment of said tire repairing container without flowing through the sealing preparation.

2. The sealing and inflating assembly as claimed in claim 1, wherein said receptacle includes a socket opening formed therein, and said outlet tube is extended into said socket opening of said receptacle.

3. The sealing and inflating assembly as claimed in claim 1, wherein said first end of said pipe is coupled to said stud of said outlet piece, and said bore of said pipe is communicative with said inlet conduit of said outlet piece.

4. The sealing and inflating assembly as claimed in claim 1, wherein said pipe includes a peripheral rib extended from said peripheral fence for engaging into said peripheral chamber of said outlet piece and for being anchored between said outlet piece and said mouth opening of said tire repairing container.

5. The sealing and inflating assembly as claimed in claim 4, wherein said outlet piece includes a washer engaged between said mouth opening of said tire repairing container and said peripheral rib of said pipe for making a seal between said mouth opening of said tire repairing container and said outlet piece.

6. The sealing and inflating assembly as claimed in claim 1, wherein said pipe includes a gasket releasably engaged in said peripheral space of said pipe for selectively blocking said at least one orifice of said pipe, and said at least one orifice of said pipe is opened when said gasket is disengaged from said peripheral space of said pipe and engaged into said peripheral chamber of said outlet piece.

7. The sealing and inflating assembly as claimed in claim 1, wherein said pipe includes a cap releasably attached to said second end of said pipe.

8. The sealing and inflating assembly as claimed in claim 1 further comprising a hose connected to said outlet conduit of said outlet piece, and an adapter attached to said hose for engaging with a tire valve.

9. The sealing and inflating assembly as claimed in claim 8, wherein said adapter includes a housing, a valve stem slidably engaged in said housing, and a sealing member attached to said valve stem for selectively engaging with said housing.

10. The sealing and inflating assembly as claimed in claim 9, wherein said housing includes a chamber formed therein, and includes a first end portion for selectively engaging with said tire valve, and includes a cylindrical member extended inwardly from said first end portion and extended into said chamber of said housing for forming an inner peripheral channel between said cylindrical member and said housing, a connector includes a compartment formed therein for engaging with said cylindrical member and for engaging into said inner peripheral channel of said housing.

11. The sealing and inflating assembly as claimed in claim 10, wherein said housing includes at least one lock notch formed therein, and a latch member engaged onto said connector and engaged into said chamber of said housing and having at least one catch for engaging with said at least one lock notch of said housing and for locking said connector to said housing.

12. The sealing and inflating assembly as claimed in claim 10, wherein said housing includes a peripheral swelling extended inwardly from the cylindrical member for selectively engaging with said sealing member of said valve stem.

13. The sealing and inflating assembly as claimed in claim 10, wherein said housing includes a screw hole formed therein, and includes a bore formed in said cylindrical member and having an inner diameter smaller than an inner diameter of said screw hole of said housing for forming a peripheral shoulder between said screw hole of said housing and said bore of said cylindrical member.

14. The sealing and inflating assembly as claimed in claim 10, wherein said connector includes an extension extended out of said housing.

15. The sealing and inflating assembly as claimed in claim 10, wherein said valve stem includes a spring-biasing member engaged between said valve stem and said cylindrical member for biasing said sealing member to engage with said cylindrical member and to selectively block said cylindrical member.

16. The sealing and inflating assembly as claimed in claim 9, wherein said valve stem includes at least one longitudinal rib for forming at least one longitudinal slot.

17. The sealing and inflating assembly as claimed in claim 9, wherein said valve stem includes a retaining ring engaged with said sealing member for retaining said sealing member on said valve stem.

* * * * *